Patented Sept. 21, 1948

2,449,928

UNITED STATES PATENT OFFICE 2,449,928

SYNTHETIC RUBBER PLASTICIZED WITH A COMPOSITION COMPOSED ESSENTIALLY OF AN AROMATIC HYDROCARBON OIL

Frank W. Corkery, Crafton, Pa., assignor to Pennsylvania Industrial Chemical Corporation, Clairton, Pa., a corporation of Pennsylvania No Drawing. Application February 26, 1944, Serial No. 524,069

12 Claims. (Cl. 260—33.6)

Coumarone — 

Indene → 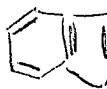

This invention relates to a liquid plasticizer for synthetic and natural rubbers and rubber-like elastomers. This is a continuation-in-part of my application Serial No. 479,225, filed March 15, 1943, now abandoned.

The most characteristic use for my plasticizer is in compounding those synthetic rubbers which are composed of copolymers of butadiene and acrylic nitriles. Such synthetic rubbers, currently represented by materials commonly known by the trade names "Perbunan," "Hycar O. R.," and "Ameripol" differ from each other in the proportioning of their polymerizable constituents and in the order of polymerization to which those constituents have been brought. In most exemplifications, however, the polymer size of the synthetic rubbers is higher than that of natural rubber. They also are deficient in their content of heavy oils and thermo-plastic resins. Whereas natural rubber is soluble in petroleum oils and may be plasticized adequately with petroleum oils, pine tar and pine tar oils, the synthetic rubbers are insoluble in petroleum oils and cannot adequately be plasticized with them or with pine tar, pine tar oil or other plasticizing substances commonly used in the compounding of natural rubber. These synthetic rubbers are not so softened by any of the commonly used plasticizers that they may be worked in a Banbury mixer or readily worked in rolls. The working time required to incorporate the plasticizer with those synthetic rubbers is long, namely 30 minutes or more if the common rubber softeners be used, and even when worked for that length of time the plasticizing effect is imperfect.

It has been a marked disadvantage of butadiene-acrylic nitrile synthetic rubber compounds that they have a poor cold test. At temperatures below about —20° C., they lose flexibility and tensile strength progressively; apparently because of the failure of the plasticizer to hold the high polymers of the highly polymerized synthetic rubbers in continuous phase. They are deficient in the tack necessary for ply type operations as in the building of vehicle tires.

For many important outdoor uses, as in vehicle tires, airplane rubber compounding for high altitude flying at low temperatures, and the like, it is important that rubber compounds have low temperature flexibility. When such uses are military, it is often required that the rubber compound retain its flexibility and tensile strength at temperatures at least as low as —40° C., and rubber compounds having still better low temperature flexibility are preferred.

The most common chemical plasticizers, such as dibutyl phthalate, are unsuitable for plasticizing the butadiene-acrylic nitrile rubbers for the reason they require long processing times on mills. Some suitable plasticizers have been found, but are not commercially available in quantity. In a plasticizer for natural and synthetic rubber, it is necessary that the material be of moderate cost and that its sources be such as to render it abundantly available.

I have determined that in order to obtain low cold test in a synthetic rubber of the butadiene-acrylic nitrile type, to render the length of time necessary for compounding reasonable, and to permit the mixing or compounding of the rubber in apparatus such as a Banbury mixer, it is necessary that the plasticizer have such high solvent power as to be a good solvent for holding the rubber in continuous phase and that it do so even at very low temperatures. There is, however, a converse limiting requirement of the plasticizer. That requirement is that the plasticizer have a boiling point sufficiently high to prevent its creeping or migration to the surface of the rubber and gradual evaporation from the rubber. Loss of the plasticizer ultimately leaves the rubber with inadequate plasticizer to hold it in continuous phase, so that it becomes hard and friable.

I am aware that the dipolymer oil composed of the dimers of coumarone and indene is used as a plasticizer in such synthetic rubber compounds. It falls short of perfection, however, in that use, because it does not possess high solvent power, thus requiring a relatively long working to incorporate the plasticizer with the synthetic rubber, and fails to give the synthetic rubber the ability to sustain an extremely low cold test.

Coumarone-indene dimer oil represents the lowest stage of polymerization of coumarone and indene. Coumarone and indene are constituents of the material known as coke oven light oil, which comes over before tar in the by-product coking of coal and which may be fractionated before or after purification into benzol, toluol, xylol or light solvent naphtha, and heavy solvent naphtha which upon purification gives high-flash solvent naphtha. The light oil as it comes from the by-product oven is a vapor which is collected by counter-flow in a petroleum cut known as "wash oil," and from which "wash oil" it is recovered by distillation in what is known as "crude" stills. In order to purify this coke oven light oil, it is treated with sulphuric acid before fractionation or its several fractions are individually purified by sulphuric acid treatment. In either case, the sulphuric acid treated material is neutralized and distilled in stills known as "pure" stills. In this distillation, there remain in the "pure" stills residues consisting largely of the dimers of coumarone and indene, together with higher coumarone-indene polymers and, as I have discovered, a substantial content of what I call "dimolar" compounds, the whole being contaminated with sulphurized compounds of coumarone and indene grouped generically under the term "sulphonates."

The above described materials, as they are taken from the "pure" stills, have been used as plasticizers for natural rubber. For such use, their solvent power is not great, since they have an aniline point somewhat higher than that of pure coumarone and indene dimers, ranging fairly closely from about 31° C. to 34° C.

As a recent technical advance, processes have been invented and developed which convert the aliphatic or chain hydrocarbons into cyclic hydrocarbons, so that the aromatics benzol, toluol, and other cyclic products are obtained from petroleum oils. Processes of this general sort are disclosed in principle, and are illustrated by description of specific exemplary operations in recent literature; as in the article "Catalytic dehydrogenation of monoolefins to diolefins" by Grosse, Morrell and Mavity, published in the March 1940 issue of Industrial and Engineering Chemistry, vol. 32, No. 3, pages 309 to 311, inclusive, and in the article "Catalytic cyclization of aliphatic hydrocarbons to aromatics" by Grosse, Morrell and Mattox, published in the April 1940 issue of Industrial and Engineering Chemistry, vol. 32, No. 4, pages 528 to 531, inclusive.

With this knowledge of cyclization and dehydrogenation, it has become possible to build mononuclear and polynuclear compounds containing the benzene ring, diolefins, hydroaromatic and unsaturated hydroaromatic hydrocarbons from aliphatic hydrocarbon materials derived from petroleum. The processes may be based, with or without the use of catalysts such as heat, acid clays, fuller's earth, anhydrous acid salts, or metallic oxides and the like, on either petroleum aliphatics or mixtures of aliphatic and aromatic hydrocarbons. The literature on this new art is scant but rapidly developing. Complete information is not publicly available at this time.

In at least some variant examples of those processes, a circulating body of petroleum oil is subjected to the cyclizing treatment comprising a vapor phase cracking to form a content of olefins and diolefins, with or without an insertion into the system of a content of aromatic hydrocarbons such as benzol, toluol, and like aromatics. Diolefins of the nature of butadiene, together with the cyclic compounds benzol, toluol, xylol, styrene, methyl-styrene, coumarone, indene, trimethyl-benzene, their isomers, and other cyclic compounds are taken off as the circulation proceeds. As removed at the end of the process or during its continuance, the recirculating oil is composed of "dimolar" compounds together with dimers and higher polymers of "light oil" unsaturates, and unpolymerized "light oil" unsaturates and saturates. As of the date of which I speak recirculating oils of this sort are not well known as to their composition or properties. They are in the nature of waste products and prior to my invention substantial commercial use for them had not been found.

Recirculating oils rich in "dimolar" compounds remain at the end of various processes performed on petroleum oils and which involve cracking, reforming, dehydrogenating, and cyclizing. One type of recirculating oils are known commercially as "Resolve" oils, which term embraces total, light, and overhead "Resolve" oils recovered as by-products in processes for producing isoprene, butadiene, and styrene, as well as from processes in which benzol, toluol, isopropylbenzene, and the like are formed from aliphatics.

More particularly, the "Resolve" (recirculating solvent oils) oils to which I refer are those remaining from the catalytic cyclizing and dehydrogenation of aliphatic, and particularly olefinic hydrocarbons for producing conjugated unsaturated aromatics suitable for forming elastomers by polymerization. Those oils recovered as by-products contain the longer chain "light oil" unsaturates such as coumarone, indene, methyl-styrene, and styrene as well as saturate aromatics such as benzol, toluol, and xylol, cumene and trimethyl benzene. Because of the dehydrogenating conditions under which they are produced, they are particularly rich in "dimolar" compounds formed from the aromatic compounds found in coke oven light oil. They also contain addition products of unsaturates such as indene, coumarone, and styrene with benzol, toluol, xylol, and high-flash solvent naphtha.

With the qualification that all the di-molecular substances which I have herein for convenience termed "dimolar" compounds are formed from compounds found in coke oven light oil, I may define them as compounds of the diphenyl series, and their alkyl and alkenyl substitution products, together with like substitution products of aliphatics. Explanation of that definition is desirable. Taking diphenyl initially, that substance consists of two benzene rings, joined with elimination of hydrogen. Diphenyl thus may be represented by the formula $C_6H_5$—$C_6H_5$, or structurally as follows:

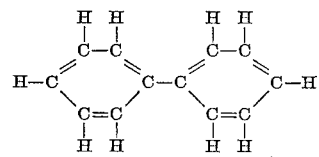

A similar arrangement is present in dibenzyl, which is two initial molecules of toluol $C_6H_5.CH_3$ linked with elimination of hydrogen in the manner structurally shown as:

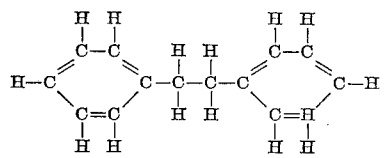

Dibenzyl thus may be considered as a phenyl-substituted ethane.

The same arrangement as in diphenyl is present in ditolyl, which is two initial molecules of toluol C₆H₅.CH₃ linked with elimination of hydrogen, as:

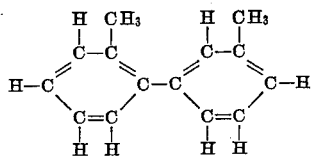

Other alkyl and alkenyl substitution products of diphenyl falling within the definition may be illustrated by the following structural formula, in which "R" is an alkyl or alkenyl substituted group:

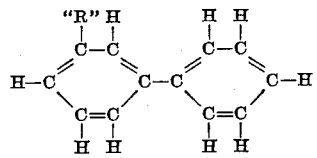

Taking phenyl-styrene as illustrative of the alkenyl substituted products, its formula may be written structurally as follows:

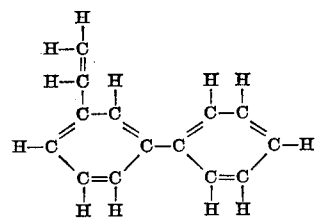

All of such compounds formed from the compounds found in coke oven light oil are found in recirculating oils from cyclizing processes and in the benzol, toluol, and xylol "pure" stills. Not all of them are usually present in any one of the designated high-boiling oils; but such oils all have a substantial content of at least one of the compounds of the group, and all the oils by virtue of a substantial content of such compound or compounds have a very low aniline point with respect to their relatively high boiling range. There are also formed and initially contained in these oils dimers of those unsaturates, together with some content of resins resulting from heat-polymerization and some content of unchanged cyclic aromatics such as benzol, toluol, xylol, high-flash solvent naphtha, coumarone, indene, and styrene.

The various phenyl compounds comprised in these oils all respond to the general formula

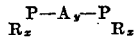

in which "P" is a phenyl group, "A" is an aliphatic group, "R" is an alkyl or alkenyl group, the subscript "$x$" is a number from zero up and "$y$" is a number including zero and unity. Considering the several specific compounds given above, it will be seen that each of them responds to this general formula.

As above noted, all the "Resolve" oils, from cyclizing processes are oils which are particularly high in "dimolar" phenyl compounds, consisting of the diphenyl series and its alkyl and alkenyl substitution products, phenyl-substituted aliphatics, and the like, formed from the compounds found in coke oven light oil. After removal of polymerizable unsaturates, chiefly represented by styrene, coumarone, and indene which would tend to render the oils unstable, together with unreacted benzene ring compounds such as benzol, toluol, and xylol by distillation, and after removal by further distillation of heat-polymers higher than dimers, there is obtained an oil which boils wholly within the approximate range of 220° C. to 350° C., and over 90% within the range of 230° C. to 300° C., and which has an averaged aniline point of from about 20° C. to 22° C.

These last mentioned practices not only are relatively new, but in their details are not currently public knowledge. The above will, however, serve adequately to identify them.

It may be noted that in the recirculating oil there is seldom any remaining content of aliphatics boiling within the ranges of the "dimolar" compounds; and such content if present is not substantial, seldom exceeding 2% of the whole. Such oils consisting less than 5% of aliphatics may justifiably be considered as essentially aromatic oils.

Returning to the desirable properties of a plasticizer, or non-evaporative solvent, for synthetic rubbers and other elastomers, it should be borne in mind that below an aniline point of about 25° C., each degree of decrease in aniline point represents great improvement in the properties of the elastomer which is plasticized. As reduction in aniline point is sought, however, each progressive decrease represents a step away from the substances previously used as plasticizers and represents the exercise of an appreciation, isolation treatment or preparatory treatment not previously employed for the production of rubber plasticizers. Considering specifically the butadiene-acrylic nitrile synthetic rubbers, the following gives the result of repeated check tests with plasticizers covering a relatively wide range of solvent power, the effectiveness of the plasticizer being established specifically in the cold test of the vulcanized elastomeric compound after it has been compounded with pigments and the like in accordance with established practices and softened with plasticizers of the given aniline point.

An aromatic plasticizer having an aniline point of 33° C. gives the elastomeric compound a cold test of —10° C.

An aromatic plasticizer having an aniline point of 28° C. gives the elastomeric compound a cold test of —20° C.

An aromatic plasticizer having an aniline point of 24° C. gives the elastomeric compound a cold test of —30° C.

An aromatic plasticizer having an aniline point of 22° C. gives the elastomeric compound a cold test of —40° C.

An aromatic plasticizer having an aniline point of 20.5° C. gives the elastomeric compound a cold test of —50° C.

An aromatic plasticizer having an aniline point of 18° C. gives the elastomeric compound a cold test lower than —50° C.

All of the above cold test data is based upon normal conditions both as concerns the pigmenting of the synthetic rubber, and the character of the rolls in which the synthetic rubber is worked with the plasticizer and pigment; and involves using as much of the plasticizer as may be usefully incorporated with the synthetic rubber without limitation in the time of working. The cold test used for the determination was conducted as follows:

Pieces of the compounded synthetic rubber were chilled in a non-reactive cooling medium; and were then tested for flexibility by bending, or by interpretation of a Shore hardness test.

The compound specifically subjected to cold tests, as exemplary of the butadiene-acrylic nitrile synthetic rubbers, was "Hycar O. R." compounded in accordance with the following formula, stated in parts by weight.

| | |
|---|---|
| "Hycar O. R." | 100 |
| Zinc oxide | 5 |
| Channel black | 50 |
| "Agerite" white | 1 |
| Stearic acid | 1 |
| "Altax" | 1.5 |
| Sulphur | 1.5 |
| Plasticizer (non-volatile solvent—as above) | 30 |

According to Davis and Blake "Chemistry and Technology of Rubber" Monograph No. 74 of the American Chemical Society, "Agerite" white is N,N'-di-B-naphthyl-p-phenylene diamine, and "Altax" is benzothiazyl disulphide.

"Perbunan" and other butadiene-acrylic nitrile synthetic rubbers, in similar formulation give closely similar results.

It will be seen from the above that only those plasticizers which have an aniline point below 25° C. give satisfactory results in compounding butadiene-acrylic nitrile synthetic rubbers and my investigation of materials for oils having the desired conjunction of such low aniline point and relative high minimum boiling point, was based upon an appreciation of the importance of solvent power in the plasticizer.

Taking the same starting elastomer and the same pigment used in determining low temperature flexibility, or "cold test," and in equal quantity, the comparative time required for compounding on rolls was found to be as follows:

For a plasticizer having an aniline point of 21° C.—7 minutes.

For a plasticizer having an aniline point of from 23° C. to 24° C.—14 minutes.

For a plasticizer having an aniline point of 25° C.—21 minutes.

For a plasticizer having an aniline point of 28° C.—28 minutes.

For a plasticizer having an aniline point of 30° C.—35 minutes.

There is thus substantial saving in time with increase in the solvent power of the plasticizer if the synthetic rubber be worked on rolls; and if the plasticizer be one having an aniline point of from 22° C. down, the butadiene-acrylic nitrile synthetic rubber may be worked satisfactorily in a Banbury mixer. Also, the greater the solvent power of the non-volatile plasticizer the better will be the tensile strength of the compounded rubber. Thus plasticizers of the lower aniline points given above provide a low temperature flexibility beyond any necessity which reasonably may be anticipated, but it will be understood that the low-temperature flexibility is indicative also of other desirable properties in the compounded elastomer.

Bearing in mind that the primary purpose of my invention is to provide a non-volatile plasticizer for butadiene-acrylic nitrile synthetic rubbers capable of giving them low-temperature flexibility, and tensile strength in high order, and which allows them to be compounded rapidly in rolls or in a Banbury mixer, I have established that 25° C. is the upper limit of aniline point for such plasticizer.

The aniline point of pure coumarone-indene dimers is about 26° C. to 27° C., and the aniline point of still residue from the sulphuric acid purification and neutralization of complete "light oil," purified of sulphonates and freed of resin polymers higher than dimers and entrapped low boiling aromatics is about 25° C. That material, i. e. the purified and stripped whole "pure" still residue, has an aniline point lower than the aniline point of pure coumarone-indene dimers because of its content of the "dimolar" compounds. It may be noted that a wholly satisfactory method of purifying "pure" still residues of sulphonates is to be found in United States patent to Samuel G. Burroughs No. 2,209,317.

Whole "pure" still residue from the purification of coke oven light oil, i. e. "light oil," is not suitable for the specific purpose of plasticizing butadiene-acrylic nitrile synthetic rubbers. This apparently is because its content of crude heavy naphtha imparts to the whole still residue a high content of coumarone-indene dimers, which is not compensated by its content of aromatic "dimolars," or diphenyl series aromatics. It is, however, a currently increasing practice to purify the benzol, toluol, and xylol fractions separately. The residues from the "pure" stills in which those fractions are distilled following sulphuric acid treatment and neutralization, largely contain the "dimolar" compounds appropriate to the fraction, together with dimers of indene and coumarone, appropriate addition products of the sort above noted, and homologous products.

After being purified of sulphonates, and freed both of resin polymers higher than the dimers of coumarone and indene and of the low boiling content, the still residues from the purification of benzol, toluol, and xylol all have aniline points below 25° C. Together with the prepared recirculating oil from processes for producing conjugated unsaturates suitable for the production of elastomers, and kindred cyclizing processes, these still residues from the purification of "light oil" fractions give plasticizers wholly suitable for butadiene-acrylic nitrile synthetic rubbers.

Thus the aniline points of the high-boiling oils obtained from these still residues are:

The purified aromatic oil from the xylol "pure" still residue has an aniline point of from 23° C. to 24° C.

The purified aromatic oil from the toluol "pure" still residue has an aniline point close to 22° C.

The purified aromatic oil from the benzol "pure" still residue has an aniline point close to 20° C.

The recirculating oils from cyclizing processes (freed of resin polymers higher than dimers and their low-boiling content) have aniline points from 18° C. to 22° C.

All these variantly derived oils are aromatic oils formed from coke oven light oil, or "light oil" compounds, which boil over 200° C. They all boil completely within the approximate range of 220° C. to 350° C. and over 90% within the approximate range of 230° C. to 300° C. It is to be understood that they all may be blended one with the other, to give such conjunction of convenience and solvent power as may be desirable under the circumstances. They may be enriched in their content of "dimolars," or diphenyl series aromatics, for specific uses in which increased solvent power is indicated.

Whereas purification of the individual "light oil" fractions benzol, toluol, and xylol has long been known, large scale commercial purification of the individual light oil fractions rather than purification of the body of "light oil" as a whole is a recent development. The specific composition and properties of the still residues from such purifications have not been determined prior to my invention, nor has there been exploration of uses to which the purified high-boiling residual oils from these fractions are particularly suited. In fact, where the purification of "light oil" fractions has been practiced it has been customary to run the still residues from all fractions into a common receptacle in which they mix as "pure" still residue.

The sources of these plasticizing oils are not only domestic but are also of such breadth as to give an abundant supply of the plasticizer to meet any reasonably anticipated demand. Increasing demands for benzol and toluol as preferred yield from "light oil" lead to increased use of "pure" stills for purification of the benzol and toluol "light oil" fractions. Increasing use of synthetic rubbers of itself leads to increased production of recirculating solvent oils having the properties which I have found to render them so desirable as plasticizing oils for the butadiene-acrylic nitrile synthetic rubbers. The oils from none of these sources require complicated and expensive preparatory treatments in order to render them suitable for their intended use.

These plasticizing oils, whether they be derived as the recirculating oils from cyclizing and dehydrogenating processes, or as still residues from the purification of benzol, toluol, and xylol fractions, are similarly prepared for use. After a topping distillation, they are distilled carefully at as low a temperature as is possible in order to avoid cracking and in order to avoid carrying over any polymers higher than dimers. If the oils contain a substantial proportion of still reactive polymerizable unsaturates, as occurs more frequently in the "Resolve" oils, they desirably are first subjected to heat-polymerization of those unsaturates and are then subjected to careful distillation.

Plasticizers in accordance with my invention are quite obviously usable with advantage in compounding elastomers other than the butadiene-acrylic nitrile synthetic resins. Compounding the butadiene-acrylic nitrile synthetic rubbers, my plasticizer desirably is used in proportion of about 25 parts by weight to 35 parts by weight for each 100 parts by weight of the elastomers. A proportional quantity is used with other elastomers, such for instance as the synthetic rubber composed of copolymers of butadiene and styrene, which currently is represented chiefly by the exemplary material having the trade name "Buna S." For plasticizing such elastomers, from 5 parts by weight to 15 parts by weight are amply sufficient in compounding 100 parts by weight of the synthetic rubber. In this and analogous uses it has particular advantage where for some specialized purpose it is desired that the synthetic rubber should not contain a high proportion of plasticizer. With natural rubber a still lower proportional quantity is adequate for compounding. It will be understood that for natural rubber and for butadiene-styrene synthetic rubber and most other elastomers, the solvent power of my plasticizer is greater than necessary.

The term "elastomer" has been used freely herein to designate generically all synthetic rubbers and rubber-like plastics.

There is literature authority for so-doing in the article "Synthetic rubber" by Fisher in the issue of Industrial and Engineering Chemistry for August 1939, vol. 31, No. 8, pages 941 to 945, inclusive, and in an article by Frederick Marchionna in the issue of the Rubber Age for June 1942, vol. 51, No. 3, pages 209 to 211, inclusive. These authors concur in the desirability of establishing the term "elastomer" as embracing the elasto-prenes or ring type chloroprenes (such as neoprene), the elastolenes, such as butadiene polymers and copolymers, the elastothiomers, or organic polysulphides ("Thiokol", etc.), and the elastoplastics, such as high-polymer molding materials. My plasticizer may be used in conjunction with any of these elastomers, and similarly to its use in plasticizing butadiene-acrylic nitrile synthetic rubbers it has peculiar utility in every instance in which high-solvent power of a non-volatile plasticizer is desirable.

Since aniline point is made a determining factor in defining my invention, and since methods of aniline point determination themselves vary, I shall give the following procedure which is standardized and checks very closely in its determination, which procedure has been used in making all the aniline point determinations given above:

Standard aniline point method

In making an aniline point determination, I redistill purified aniline, rejecting the first 10% and the last 5% of the distillate. I have for use with this distilled aniline, petroleum naphtha of the grade known commercially as Stoddard solvent boiling chiefly between 150° C. and 200° C., which petroleum naphtha has previously been standardized against aniline by the method which follows to have an aniline point of 60° C. plus or minus 1° C.

In proceeding, I pipette 5 cc. of the material for determination into a French square bottle and pipette 5 cc. of the Stoddard solvent having an aniline point of 60° C. into the same bottle. I stopper and shake the bottle. I then pipette 2½ cc. of the mixture into a 25 x 100 mm. test tube, and 5 cc. of the freshly distilled aniline is also pipetted into the same tube. The test tube is stoppered with a cork containing a thermometer of suitable range in such manner that the bulb of the thermometer extends centrally into the mixture in the test tube. This final mixture is warmed gently until complete miscibility is reached, and is then cooled at the rate of 2° C. per minute. An observation of the temperature at which the first sign of cloudiness appears in the mixture gives the aniline point for the material, the aniline point of which is to be determined. I have found that this method is accurate within .2 of one degree centigrade.

Boiling ranges as given in the foregoing specification are all determined by straight distillation without the use of steam or vacuum. Where percentages are given without qualification, it is to be understood that they represent proportions based upon parts by weight. Where ranges are given without qualification, they are to be taken as "inclusive." Numerous changes from the exemplifications of my invention as above given may be made without going beyond the scope of the invention as defined by the appended claims.

I claim as my invention:

1. The method of plasticizing a synthetic rubber selected from the synthetic rubbers composed of the rubbery copolymers of butadiene and acrylic nitrile and the synthetic rubbers composed of the rubbery copolymers of butadiene and styrene by working the synthetic rubber with from 5% to 35% its weight of a liquid plasticizer composed essentially of an aromatic oil purified of contaminates and approximately free of polymers higher than dimers formed from compounds found in coke oven light oil and boiling within the approximate range of 220° C. to 350° C. which has an average aniline point no higher than 25° C. by virtue of a substantial content of at least one compound of the group responding to the formula

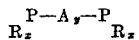

in which "P" is a phenyl group, "A" is an aliphatic group, "R" is selected from the group consisting of alkyl and alkenyl groups, "x" is a number up to unity and "y" is a number up to unity.

2. The method of plasticizing a synthetic rubber by working the synthetic rubber selected from the synthetic rubbers composed of the rubbery copolymers of butadiene and acrylic nitrile and the synthetic rubbers composed of the rubbery copolymers of butadiene and styrene with from 5% to 35% its weight of a liquid plasticizer composed essentially of an aromatic oil purified of contaminates and approximately free of polymers higher than dimers formed from the compounds found in coke oven light oil and boiling from about 220° C. to 350° C., and the said plasticizer having an average aniline point below 22° C. by virtue of a substantial content of at least one compound of the group responding to the formula

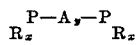

in which "P" is a phenyl group, "A" is an aliphatic group, "R" is selected from the group consisting of alkyl and alkenyl groups, "x" is a number up to unity and "y" is a number up to unity.

3. The method of plasticizing a synthetic rubber by working the synthetic rubber selected from the synthetic rubbers composed of rubbery copolymers of butadiene and acrylic nitrile and the synthetic rubbers composed of the rubbery copolymers of butadiene and styrene with from 5% to 35% its weight of a liquid plasticizer composed essentially of an aromatic oil purified of contaminates and approximately free of polymers higher than dimers formed from compounds found in coke oven light oil and boiling within the approximate range 220° C. to 350° C., and having an average aniline point within the approximate range of 18° C. to 24° C. by virtue of a substantial content of at least one compound of the group responding to the formula

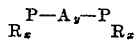

in which "P" is a phenyl group, "A" is an aliphatic group, "R" is selected from the group consisting of alkyl and alkenyl groups, "x" is a number up to unity and "y" is a number up to unity.

4. The method of plasticizing a synthetic rubber by working the synthetic rubber selected from the synthetic rubbers composed of the rubbery copolymers of butadiene and acrylic nitrile and the synthetic rubbers composed of the rubbery copolymers of butadiene and styrene with from 5% to 35% its weight of a liquid plasticizer composed essentially of an aromatic oil purified of contaminates and approximately free of polymers higher than dimers formed from compounds found in coke oven light oil, which aromatic oil is derived from the recirculating oils in processes for cyclizing initially aliphatic hydrocarbon oils, the said aromatic oil boiling from about 220° C. to 350° C. and comprising a mixture of dimers of unsaturated light oil compounds and at least one compound of the group responding to the formula

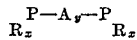

in which "P" is a phenyl group, "A" is an aliphatic group, "R" is selected from the group consisting of alkyl and alkenyl groups, "x" is a number up to unity and "y" is a number up to unity, and having by virtue of a substantial content of the latter an aniline point below 22° C.

5. The method of plasticizing a butadiene-acrylic nitrile synthetic rubber by working the said synthetic rubber with 25% to 35% its weight of a liquid plasticizer composed essentially of an aromatic oil purified of contaminates and approximately free of polymers higher than dimers formed from compounds found in coke oven light oil and boiling within the approximate range of 220° C. to 350° C. which has an average aniline point no higher than 25° C. by virtue of a substantial content of at least one compound of the group responding to the formula

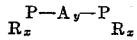

in which "P" is a phenyl group, "A" is an aliphatic group, "R" is selected from the group consisting of alkyl and alkenyl groups, "x" is a number up to unity and "y" is a number up to unity.

6. The method of plasticizing a butadiene-acrylic nitrile synthetic rubber by working the said synthetic rubber with 25% to 35% its weight of a liquid plasticizer composed essentially of an aromatic oil purified of contaminates and approximately free of polymers higher than dimers formed from the compounds found in coke oven light oil and boiling from about 220° C. to 350° C., and the said plasticizer having an average aniline point below 22° C. by virtue of a substantial content of at least one compound of the group responding to the formula

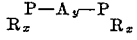

in which "P" is a phenyl group, "A" is an aliphatic group, "R" is selected from the group consisting of alkyl and alkenyl groups, "x" is a number up to unity and "y" is a number up to unity.

7. The method of plasticizing a butadiene-acrylic nitrile synthetic rubber by working the said synthetic rubber with 25% to 35% its weight of a liquid plasticizer composed essentially of an aromatic oil purified of contaminates and approximately free of polymers higher than dimers formed from compounds found in coke oven light oil and boiling within the approximate range of 220° C. to 350° C., and having an average aniline point within the approximate range of 18° C. to 24° C. by virtue of a substantial content of at least one compound of the group responding to the formula

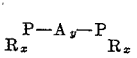

in which "P" is a phenyl group, "A" is an aliphatic group, "R" is selected from the group consisting of alkyl and alkenyl groups, "x" is a number up to unity and "y" is a number up to unity.

8. The method of plasticizing a butadiene-acrylic nitrile synthetic rubber by working the said synthetic rubber with 25% to 35% its weight of a liquid plasticizer composed essentially of an aromatic oil purified of contaminates and approximately free of polymers higher than dimers formed from compounds found in coke oven light oil, which aromatic oil is derived from the recirculating oils in processes for cyclizing initially aliphatic hydrocarbon oils, the said aromatic oil boiling from about 220° C. to 350° C. and comprising a mixture of dimers of unsaturated light oil compounds and at least one compound of the group responding to the formula

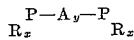

in which "P" is a phenyl group, "A" is an aliphatic group, "R" is selected from the group consisting of alkyl and alkenyl groups, "$x$" is a number up to unity and "$y$" is a number up to unity, and having by virtue of a substantial content of the latter an aniline point below 22° C.

9. The method of plasticizing a synthetic rubber composed of copolymers of butadiene and styrene by working the said synthetic rubber with 5% to 15% its weight of a liquid plasticizer composed essentially of an aromatic oil purified of contaminates and approximately free of polymers higher than dimers formed from compounds found in coke oven light oil and boiling within the approximate range of 220° C. to 350° C. which has an average aniline point no higher than 25° C. by virtue of substantial content of at least one compound of the group responding to the formula

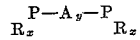

in which "P" is a phenyl group, "A" is an aliphatic group, "R" is selected from the group consisting of alkyl and alkenyl groups, "$x$" is a number up to unity and "$y$" is a number up to unity.

10. The method of plasticizing a synthetic rubber composed of copolymers of butadiene and styrene by working the said synthetic rubber with 5% to 15% its weight of a liquid plasticizer composed essentially of an aromatic oil purified of contaminates and approximately free of polymers higher than dimers formed from the compounds found in coke oven light oil and boiling from about 220° C. to 350° C., and the said plasticizer having an average aniline point below 22° C. by virtue of a substantial content of at least one compound of the group responding to the formula

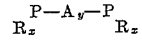

in which "P" is a phenyl group, "A" is an aliphatic group, "R" is selected from the group consisting of alkyl and alkenyl groups, "$x$" is a number up to unity and "$y$" is a number up to unity.

11. The method of plasticizing a synthetic rubber composed of copolymers of butadiene and styrene by working the said synthetic rubber with 5% to 15% its weight of a liquid plasticizer composed essentially of an aromatic oil purified of contaminates and approximately free of polymers higher than dimers formed from compounds found in coke oven light oil and boiling within the approximate range of 220° C. to 350° C., and having an average aniline point within the approximate range of 18° C. to 24° C. by virtue of a substantial content of at least one compound of the group responding to the formula

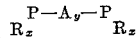

in which "P" is a phenyl group, "A" is an aliphatic group, "R" is selected from the group consisting of alkyl and alkenyl groups, "$x$" is a number up to unity and "$y$" is a number up to unity.

12. The method of plasticizing a synthetic rubber composed of copolymers of butadiene and styrene by working the said synthetic rubber with 5% to 15% its weight of a liquid plasticizer composed essentially of an aromatic oil purified of contaminates and approximately free of polymers higher than dimers formed from compounds found in coke oven light oil, which aromatic oil is derived from the recirculating oils in processes for cyclizing initially aliphatic hydrocarbon oils, the said aromatic oil boiling from about 220° C. to 350° C. and comprising a mixture of dimers of unsaturated light oil compounds and at least one compound of the group responding to the formula

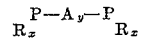

in which "P" is a phenyl group, "A" is an aliphatic group, "R" is selected from the group consisting of alkyl and alkenyl groups, "$x$" is a number up to unity and "$y$" is a number up to unity and having by virtue of a substantial content of the latter an aniline point below 22° C.

FRANK W. CORKERY.

REFERENCES CITED

The following references are of record in the file of this patent:

UNITED STATES PATENTS

| Number | Name | Date |
| --- | --- | --- |
| 1,625,415 | Lilienfeld | Apr. 19, 1927 |
| 2,128,985 | Carmody | Sept. 6, 1938 |
| 2,149,577 | Carmody | Mar. 7, 1939 |
| 2,153,141 | Engel | Apr. 4, 1939 |
| 2,207,552 | Putt | July 9, 1940 |
| 2,282,327 | Dreisbach | May 12, 1942 |
| 2,285,562 | Britton et al. | June 9, 1942 |
| 2,342,090 | Sachanen et al. | Feb. 15, 1944 |
| 2,350,007 | Zerbe | May 30, 1944 |
| 2,373,982 | Sturrock et al. | Apr. 17, 1945 |

FOREIGN PATENTS

| Number | Country | Date |
| --- | --- | --- |
| 639,354 | Germany | Dec. 3, 1936 |